(12) United States Patent
Zedlitz

(10) Patent No.: US 9,594,811 B2
(45) Date of Patent: Mar. 14, 2017

(54) METHOD AND SYSTEM FOR LIMITING DATABASE ACCESS RESULTS

(71) Applicant: Albert Zedlitz, Wiesloch (DE)

(72) Inventor: Albert Zedlitz, Wiesloch (DE)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 13/934,157

(22) Filed: Jul. 2, 2013

(65) Prior Publication Data
US 2015/0012526 A1 Jan. 8, 2015

(51) Int. Cl.
*G06F 17/30* (2006.01)
*G06F 7/00* (2006.01)
*G06F 3/0485* (2013.01)
*G06F 3/0481* (2013.01)

(52) U.S. Cl.
CPC .. *G06F 17/30554* (2013.01); *G06F 17/30483* (2013.01); *G06F 17/30905* (2013.01); *G06F 3/0481* (2013.01); *G06F 3/0485* (2013.01)

(58) Field of Classification Search
None
See application file for complete search history.

(56) References Cited

U.S. PATENT DOCUMENTS

| 2003/0078917 | A1* | 4/2003 | Goralwalla | G06F 17/3041 |
| 2006/0117000 | A1* | 6/2006 | Lulu | G06F 17/30967 |
| 2008/0288449 | A1 | 11/2008 | Kim et al. | |
| 2008/0307312 | A1 | 12/2008 | Misra et al. | |
| 2010/0161593 | A1 | 6/2010 | Paulsen et al. | |
| 2011/0113062 | A1 | 5/2011 | Quinlan et al. | |
| 2012/0246557 | A1 | 9/2012 | Venugopal et al. | |
| 2012/0317231 | A1 | 12/2012 | Bhatti et al. | |

FOREIGN PATENT DOCUMENTS

| EP | 0455447 B1 | 6/1999 |
| EP | 1033664 B1 | 12/2006 |

OTHER PUBLICATIONS

Cruz, Isabel F., et al., "A User-Centered Interface for Querying Distributed Multimedia Databases", (Oct. 11, 1998), 5 pgs.
Passos, Leonardo Teixeira, et al., "Personalizing Web Sites for Mobile Devices using a Graphical User Interface", (2004), 8 pgs.
"European Application Serial No. 14175318.6, Office Action mailed Oct. 12, 2015", 11 pgs.

* cited by examiner

*Primary Examiner* — Sangwoo Ahn
(74) *Attorney, Agent, or Firm* — Schwegman Lundberg & Woessner, P.A.

(57) ABSTRACT

A method includes generating a request for data sets in a database via a user interface, modifying the request as a function of a number, n, of data sets visible in the user interface, sending the modified request to the database for execution, and receiving n data sets from the database responsive to the modified request to display on the user interface.

19 Claims, 5 Drawing Sheets

```
<!DOCTYPE html>
<html>                          ← 410
    <style type="text/css">
        body {
            font:12px Arial, Helvetica, sans-serif;
            background:#cfcfcf url(bkg-body.png) repeat-x; overflow-y:scroll;
            margin: 20px
        } div.scrolling {
            position: relative;
            overflow: auto;
            height   : 300px;
            width    : 300px;
            margin   : 40px;
            border   : 1px;

} div.header {
            position: relative;
            margin   : 20px;
        }
    </style>

<body command="context devtrc">

<img src="sap-logo.png" alt="SAP" />

<div format="context"><h1>_(Hello) {login-user}</h1></div>

<div class="scrolling" context="example">
            <table  border="1" command="select * from customer">
                <th format="list[0:0][:]"><td>{}</td></th>
                <tr format="list[1:7][:]"><td>{}</td></tr>
            </table>
            <form method="post"   class="search" id="searchsite" title="">
                <table>                                              ← 420
                    <td>
                        <input type="submit" name="Navigate"  value="Top">
                        <input type="submit" name="Navigate"  value="Prev">
                        <input type="submit" name="Navigate"  value="Next">
                        <input type="submit" name="Navigate"  value="Last">
                    </td>
                <table>
            </form>
        </div>

</body>
</html>
```

*FIG. 4*

```
i»¿%HANA/1.0
content-object: table 0x0 40, 7, 0
content-encoding: text/xls
content-length: 466

ADRC~CLIENT  |ADRC~ADRNO  |ADRC~FROMDATE  |ADRC~COUNTRY  |ADRC~POSTCODE
000          |0000010670   |00010101        |DE             | 1
000          |0000010671   |00010101        |DE             | 2
000          |0000010671   |00010101        |DE             | 3
000          |0000010671   |00010101        |DE             | 4
000          |0000010671   |00010101        |DE             | 5
000          |0000010671   |00010101        |DE             | 6
000          |0000010671   |00010101        |DE             | 7
```

METHOD AND SYSTEM FOR LIMITING DATABASE ACCESS RESULTS

BACKGROUND

Many database driven application programs contain three tiers of programming. The three tiers consist of a user interface, an application, and the database. The application generally selects a set of data from the database, assembles the set of data and provides it for display and user interaction on the user interface.

SUMMARY

A method includes generating a request for data sets in a database via a user interface, modifying the request as a function of a number, n, of data sets visible in the user interface, sending the modified request to the database for execution, and receiving n data sets from the database responsive to the modified request to display on the user interface.

A computer readable storage device has instructions to cause a computer to execute a method. The method includes generating a request for data sets in a database via a user interface, modifying the request as a function of a number, n, of data sets visible in the user interface, sending the modified request to the database for execution, and receiving n data sets from the database responsive to the modified request to display on the user interface.

A system includes a user interface having a capability to display a known number, n, of data sets. The system also includes a connection to a database containing data sets corresponding to an application a cursor corresponding to a set of n records in the database, the cursor configured to interact with the user interface and the database to point to a set of n records to display via the user interface for fulfilling requests for sets of records in the database.

BRIEF DESCRIPTION OF THE DRAWINGS

FIG. 4 is a code of implementing a method of limiting displayed results for a query according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In a three tier application, the application generally selects a set of data from the database, assembles the set of data and provides it for display and user interaction on the user interface. Most business applications simply ignore the fact that a human end user may not be very much interested in more than 10 data sets. More than 10 data sets in addition would not even be visible on a typical mobile user interface display without further user interaction with the interface, such as scrolling.

Even if the application only renders a small set of data for display, a large part of the database may be contained in local memory and caches, because not all levels of the architecture are informed about restrictions defined in a user interface layout.

In various embodiments, selected data is reduced as a function of an amount which is visible on an end user display screen. The screen may be fairly small in the case of a mobile device, or may be larger for laptop or desktop type computer systems. In further embodiments, the reduction in selected data may be used in any application with database access to define smaller chunks. The amount of selected data may be equal to that which is viewable in a display device, or may include a few more or less in different embodiments to allow for some amount of scrolling. The reduction in selected data may result in reduced network traffic and memory utilization peaks during processing.

Figure 1:
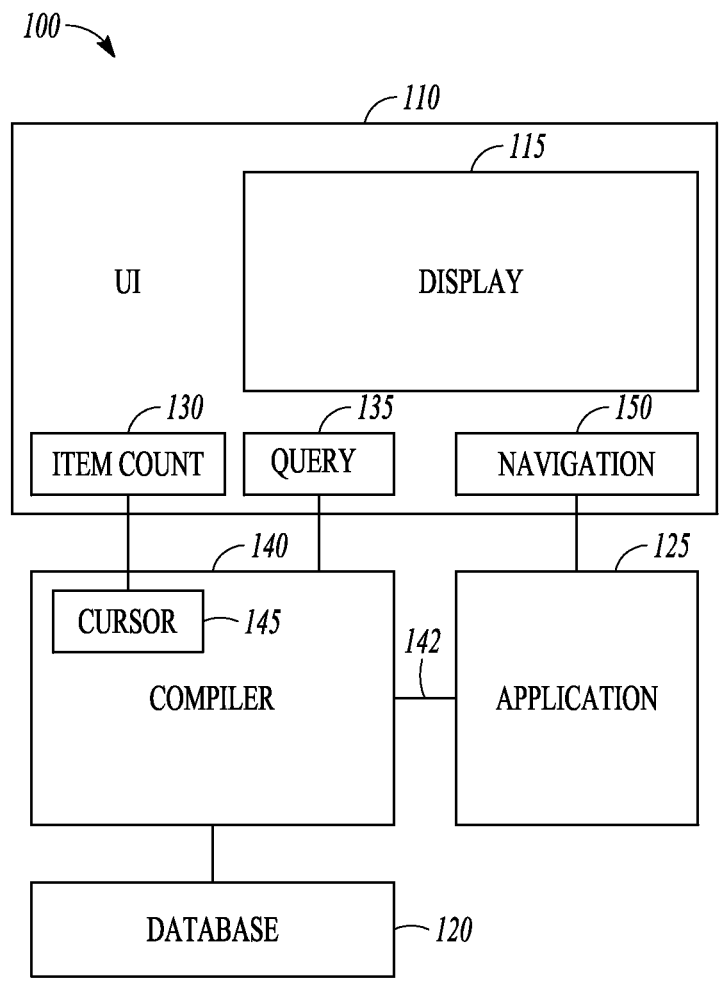
FIG. 1 is a block diagram of a system to select and display records consistent with an interface according to an example embodiment.

FIG. 1 is a block diagram illustrating a system 100. System 100 includes a user interface 110 having a display 115 which is capable of displaying a limited number of sets of data obtained from a database 120. The user interface may be driven by an application 125. Application 125 may be one of many different types of business applications, such as financial, human resources, production planning, and other types of applications.

In one embodiment, the limited number of sets displayable by display 115 is stored in a user interface table 130 as an item count. The item count may also be another number desired by a user or other entity that is not related to the display size, but may be selected for some other reason, perhaps related to bandwidth utilization concerns in further embodiments. The user interface 110 provides for the generation of queries 135 which may include multiple select statements. A compiler 140 receives the queries and provides a connection to database 120. In one embodiment, the compiler 140 combines the select statements and evaluates invariants to ensure that common used data is selected only once for an entire page of sets of data to be displayed. The compiler 140 also utilizes a database cursor 145. The visible item count 130 is mapped to the database cursor in one embodiment. The cursor 145 may be active for a session, such as when a user is logged into an application, or utilizing a set of functions in the application.

In one embodiment, the user interface 110 has a table structure that may be related to database content. The user interface 110 defines the access to the database with all necessary select statements and assigns application 125 hooks 142, which calculate the visible items. The select statements and hooks 142, including database access strategy and method hooks 142 result in the query request set 135.

The compiler 145 combines all the select statements and evaluates invariants to ensure common used data are selected only once for the entire page to be displayed. The visible item count in the user interface table 130, is mapped to the database cursor 145 as follows:

```
SQLSetStmtAttr(stmt, SQL_ATTR_CURSOR_TYPE,
(SQLPOINTER)SQL_CURSOR_DYNAMIC, 0);
SQLSetStmtAttr(stmt, SQL_ATTR_ROW_ARRAY_SIZE,
(SQLPOINTER)itemCount, 0);
```

A navigation request 150 in the user interface results into a database cursor navigation:

```
SQLFetchScroll(aHstmt, SQL_FETCH_NEXT, 0);
SQLFetchScroll(aHstmt, SQL_FETCH_PRIOR, 0);
```

Following this strategy, only the values, which are necessary for the user interface, are physically accessed and transferred. In one embodiment, a limit, n, corresponding to the item count 130 that is displayable on the display 115 is 10 rows, also referred to as sets. Some example requests for data from the database may include selection of employees from an organization chart, or display of customers. The number of employees or customers may range up to thousands or millions. Queries that are not modified via the item count and corresponding cursor may result in large numbers of results being returned, overloading memory and network capacity. The use of database cursors 145 in one embodiment facilitates dividing queries into multiple different queries for purposes of parallel processing of requests. A result set may result in a set of SQL statements, which may be executed in parallel.

In some embodiments, the item count 130 is calculated prior to generation of select statements, in a method referred as reverse select. "Reverse select" denotes a method, starting with the output design and calculating necessary information based on visible items. The application 125 methods are designed as a set of hooks, which are called by the user interface 110.

"Reverse Select" enables applications 125 to find invariants, which would reduce the number of database 120 selects and data transfer to a minimum. In this approach all SQL select statements are gathered at a central place, which would give the entire application possibilities for optimizations. The compiler maps visible items to a set of database cursors, which are used for navigation.

The user interface 110 is the master of the database 120 access, which would make it easy to map incoming request and form data to the corresponding database tables.

The user interface 110 selects the application 125, which works on the data. The application 125 on the other hand is free from parsing and dispatching incoming requests. Application method hooks are used for calculation on selected data, either before output or after input. Hooks may perform calculations for security issues, extended data access checks and consistency checks.

Figure 2:
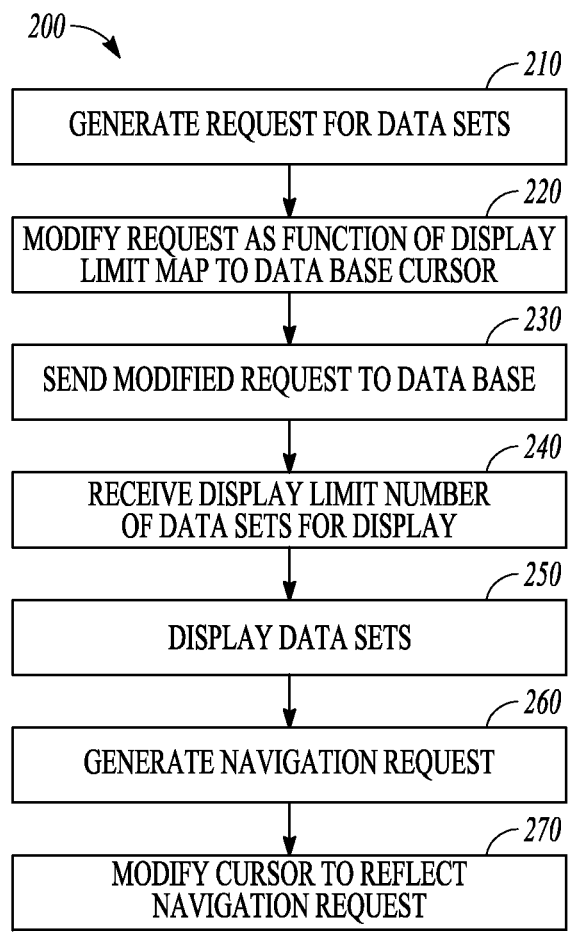
FIG. 2 is a flow diagram illustrating a method of limiting a number of records retrieved and displayed according to an example embodiment.

FIG. 2 is a flowchart representation of a method 200 to control database access requests in accordance with a display size limit. At 210, a request for data sets in a database is generated via the user interface, or is otherwise received. The request is then modified as a function of a limit of a number of data sets to be retrieved at 220. The number of data sets may be limited to a number that can be displayed on a user interface display device in one embodiment. The number may be mapped to a database cursor in some embodiments.

The modified request is then sent to the database 230 and may be executed by the database to return the specified number of data sets or less if fewer results exist in the database. At 240, the data sets are received for display, and displayed at 250. In some embodiments, a navigation request may be generated at 260. The navigation request may result from user interaction with the user interface, such as selecting an option to see more results. At 270, the navigation request results in the cursor being modified to reflect the navigation request, and a new set of data being requested from the database and again received and displayed on the display device. In one embodiment, n, corresponds to the number of results to be displayed, wherein n is defined in a user interface table as a visible item count. n is then mapped to the database cursor. Modifying the request at 220 may include gathering select statements and mapping visible items to a set of database cursors. The combined data base select statements limit data selected from the database in accordance with the number of data sets identified in the cursors. The set of database cursors may then be used for navigation.

Figure 3:
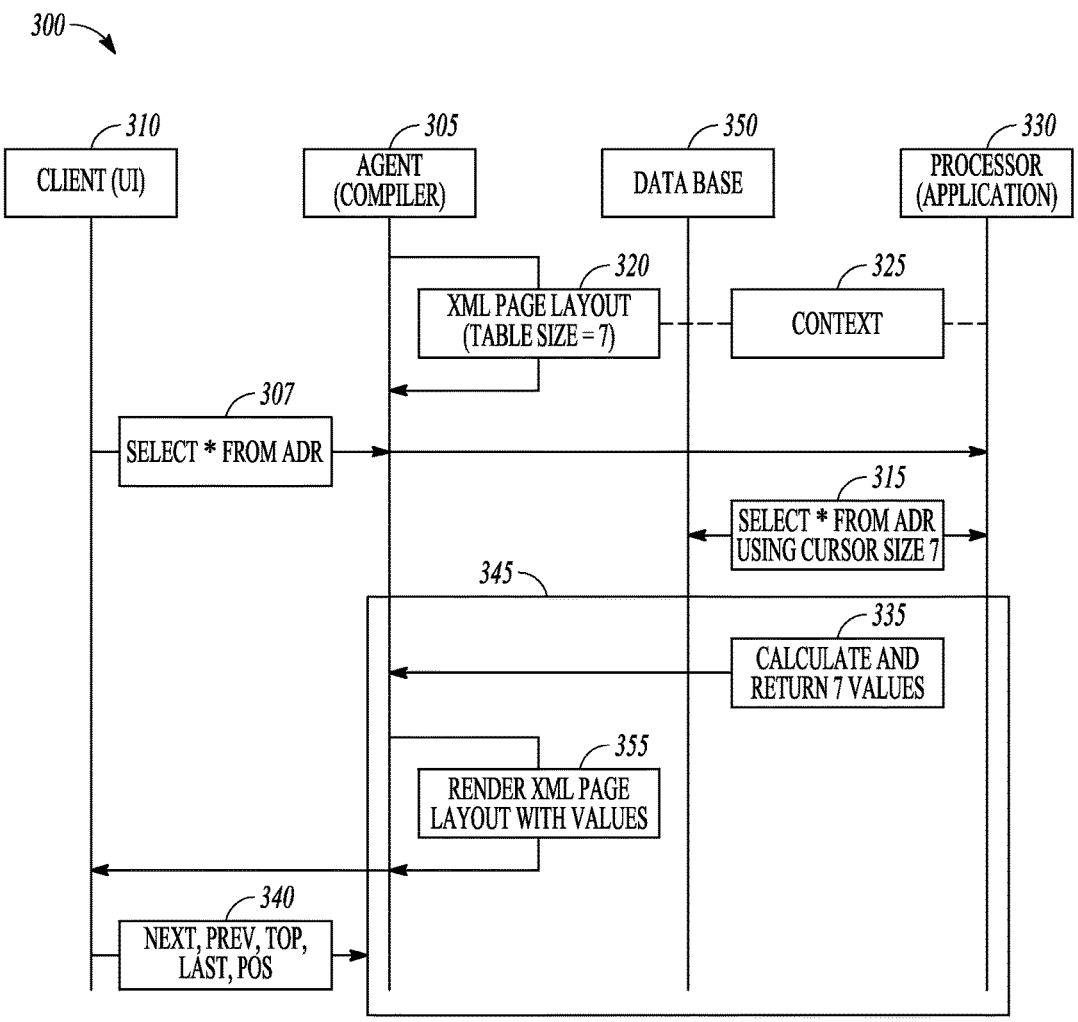
FIG. 3 is a block work flow diagram of processing an example user query according to an example embodiment.

In one example embodiment illustrated at 300 in a block workflow diagram in FIG. 3, a simple query example is shown, illustrating how a query is modified to limit the number of items identified and returned for display. An agent 305 receives a client select request 307 from a client user interface 310 and generates SQL statements 315 according an XML page layout 320, specifying a page layout with a table size of seven. In this example the following XML attributes would trigger the agent:

Context 325: This is the URI (uniform resource identifier) for the processor 330 Command 335: This executes an agent command and connects the backend processor 330

Format 320: Defines the selection scope and format specification

Possible commands are defined by the processor. The processor is determined by URI in context statement 325. After the first request the commands "Top", Prev", "Next", "Pos" and "Last" 340 could be used to navigate in a result set 345 obtained from database 350. An XML page is rendered with the values at 355.

FIG. 4 at 400 illustrates code for performing the above example 300. Style types are defined generally at 410, and navigation commands including "Top", Prev", "Next", and "Last" are defined at 420.

Figures 5, 6:
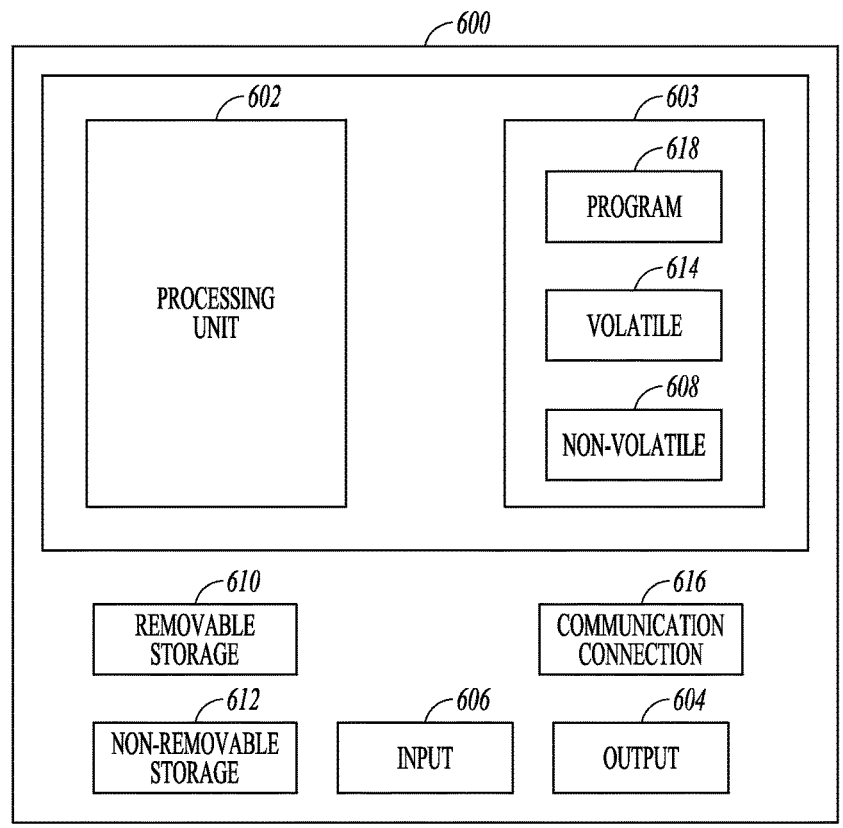
FIG. 5 is a diagram illustrating results obtained via a method of limiting displayed results for a query according to an example embodiment.
FIG. 6 is a block diagram of a computer system for implementing one or more methods or systems according to an example embodiment.

FIG. 5 at 500 illustrates the information returned for display in one embodiment. The database returns seven rows according to the format description, and the processor returns the results in an HTTP format to the agent as shown at 500.

In one embodiment, the agent 305 interprets the rows and replaces the tags with the command and format attributes. The agent 305 puts the first row as header (range specification in <td> for row "[0:0]") and generates an entry for each column (second range specification for column "[:]" together with content format "{ }")

<th format="list[0:0][:]"><td>{ }</td></th>

All other rows are interpreted as content:

<tr format="list[1:7][:]"><td>{ }</td></tr>

The range specification in the <tr> format is taken as size for the database cursor. The Processor returns the actual position in the selection, which could also be used as an item in the XML layout.

In the example above, the processor 330 returns the navigation details with following entry:

content-object: <type> <id> <number of rows> <visible rows> <start row>

In the example the table in database has 40 entries. There are 7 rows starting at position 0.

FIG. 6 is a block schematic diagram of a computer system 600 which may be used to implement various components and methods according to an example embodiment. Computer system 600 may be used to provide a user interface in the form of a hand held wireless device or other type of laptop or desktop personal computer. The application may also run on the same or a different networked computer system, as may the database. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of computer 600, may include a processing unit 602, memory 603, removable storage 610, and non-removable storage 612. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. A method comprising:
generating a request for data sets in a database via a user interface;
modifying the request as a function of a number, n, of data sets visible in the user interface;
sending the modified request to the database for execution; and
receiving n data sets from the database responsive to the modified request to display on the user interface.

2. The method of example 1 and further comprising displaying the n received data sets on the user interface.

3. The method of any of examples 1-2 wherein n is defined in a user interface table as a visible item count.

4. The method of example 3 and further comprising mapping the visible item count to a database cursor.

5. The method of example 4 and further comprising:
generating a navigation request via interaction with the user interface; and modifying the database cursor to reflect the navigation request interaction.

6. The method of example 5 and further comprising:
sending the modified database cursor to the database for execution; and receiving n data sets from the database responsive to the modified database cursor to display on the user interface.

7. The method of any of examples 1-6 wherein modifying the request comprises:
gathering select statements;
mapping visible items to a set of database cursors; and
using the set of dataset cursors for navigation.

8. A computer readable storage device having instructions to cause a computer to execute a method, the method comprising:
generating a request for data sets in a database via a user interface;
modifying the request as a function of a number, n, of data sets visible in the user interface;
sending the modified request to the database for execution; and
receiving n data sets from the database responsive to the modified request to display on the user interface.

9. The computer readable storage device of example 8 wherein the method further comprises displaying the n received data sets on the user interface.

10. The computer readable storage device of any of examples 8-9 wherein n is defined in a user interface table as a visible item count.

11. The computer readable storage device of example 10 wherein the method further comprises mapping the visible item count to a database cursor.

12. The computer readable storage device of example 11 wherein the method further comprises:
generating a navigation request via interaction with the user interface; and
modifying the database cursor to reflect the navigation request interaction.

13. The computer readable storage device of example 12 wherein the method further comprises:
sending the modified database cursor to the database for execution; and receiving n data sets from the database responsive to the modified database cursor to display on the user interface.

14. The computer readable storage device of any of examples 8-13 wherein modifying the request comprises:
gathering select statements;
mapping visible items to a set of database cursors; and
using the set of dataset cursors for navigation.

15. A system comprising:
a user interface having a capability to display a known number, n, of data sets;
a connection to a database containing data sets corresponding to an application; and
a cursor corresponding to a set of n records in the database, the cursor configured to interact with the user interface and the database to point to a set of n records to display via the user interface for fulfilling requests for sets of records in the database.

16. The system of example 15 wherein the user interface combines database select statements to limit data selected from the database in accordance with the number of data sets identified in the cursor.

17. The system of any of examples 15-16 wherein the connection to the database comprises a compiler to receive combined database select statements and modify the combined database select statements.

18. The system of example 17 wherein the compiler is coupled to an application via application hooks provided with the combined database select statements.

19. The system of example 18 wherein the compiler is coupled to receive a navigation request from the user interface.

20. The system of example 19 wherein the navigation request has two selectable functions including a fetch next n records and a fetch prior n set of records.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving, by a computing system, a request for data sets in a database generated via a user interface, the request comprising multiple select statements;
combining, by the computing system, the multiple select statements and evaluating invariants to select common used data only once for an entire page of sets of data to be displayed on the user interface;
determining, by the computing system, a visible item count representative of a limited amount of data sets displayable on the user interface, that is stored in a user interface table of the user interface;
generating, by the computing system, a modified request comprising the combined multiple select statements and the visible item count;
sending, by the computing system, the modified request to the database for execution; and
receiving, by the computing system and in response to the modified request, a number of data sets from the database corresponding to the visible item count to display on the user interface;
wherein the number of data sets are displayed on the user interface.

2. The method of claim 1, wherein the visible item count is calculated prior to generating the request and stored in the user interface table.

3. The method of claim 1, further comprising mapping the visible item count to a database cursor.

4. The method of claim 3 and further comprising:
generating a navigation request via interaction with the user interface; and
modifying the database cursor to reflect the navigation request interaction.

5. The method of claim 4 and further comprising:
sending the modified database cursor to the database for execution; and
receiving a number of data sets from the database corresponding to the visible item count and responsive to the modified database cursor to display on the user interface.

6. The method of claim 1, wherein the number of data sets from the database corresponding to the visible item count is a number less than or equal to the visible item count.

7. The method of claim 1, wherein the visible item count is based on bandwidth utilization.

8. The method of claim 1, wherein the visible item count is based on more than that which is viewable in the user interface to allow for scrolling.

9. A non-transitory computer readable storage device having instructions to cause a computer to perform operations comprising:
receiving a request for data sets in a database generated via a user interface, the request comprising multiple select statements;
combining the multiple select statements and evaluating invariants to select common used data only once for an entire page of sets of data to be displayed on the user interface;
determining a visible item count representative of a limited amount of data sets displayable on the user interface, that is stored in a user interface table of the user interface;
generating a modified request comprising the combined multiple select statements and the visible item count;
sending the modified request to the database for execution;
receiving, in response to the modified request, a number of data sets from the database corresponding to the visible item count to display on the user interface;
wherein the number of data sets are displayed on the user interface.

10. The non-transitory computer readable storage device of claim 9, the operations further comprising: mapping the visible item count to a database cursor.

11. The non-transitory computer readable storage device of claim 10, the operations further comprising:
generating a navigation request via interaction with the user interface; and
generating a modified database cursor by modifying the database cursor to reflect the navigation request interaction.

12. The non-transitory computer readable storage device of claim 11, the operations further comprising:
sending the modified database cursor to the database for execution; and
receiving a number of data sets from the database responsive to the modified database cursor to display on the user interface.

13. The non-transitory computer readable storage device of claim 9, the operations further comprising:

gathering the multiple select statements;

mapping visible items to a set of database cursors; and using the set of dataset cursors for navigation.

14. A system comprising:

a processor; and a non-transitory computer-readable medium coupled with the processor, the computer-readable medium comprising instructions stored thereon that are executable by the processor to cause the system to perform operations comprising:

receiving a request for data sets in a database generated via a user interface, the request comprising multiple select statements;

combining the multiple select statements and evaluating invariants to select common used data only once for an entire page of sets of data to be displayed on the user interface;

determining a visible item count representative of a limited amount of data sets displayable on the user interface, that is stored in a user interface table of the user interface;

generating a modified request comprising the combined multiple select statements and the visible item count;

sending the modified request to the database for execution;

receiving, in response to the modified request, a number of data sets from the database corresponding to the visible item count to display on the user interface;

wherein the number of data sets are displayed on the user interface.

15. The system of claim 14, the operations further comprising:

receiving a navigation request generated via the user interface.

16. The system of claim 15, wherein the navigation request comprises two selectable functions including a fetch next set of records and a fetch prior set of records.

17. The system of claim 14, the operations further comprising:

mapping the visible item count to a database cursor.

18. The system of claim 17, the operations further comprising:

generating a navigation request via interaction with the user interface; and generating a modified database cursor by modifying the database cursor to reflect the navigation request interaction.

19. The system of claim 18, the operations further comprising:

sending the modified database cursor to the database for execution; and receiving a number of data sets from the database corresponding to the visible item count and responsive to the modified database cursor to display on the user interface.

* * * * *